Figure 1:
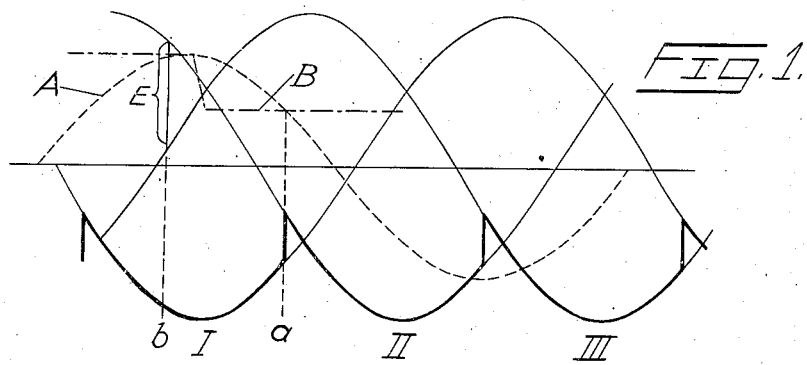

Aug. 16, 1949.  U. LAMM  2,479,242

GRID CONTROL FOR STATIC CURRENT CONVERTERS

Filed Dec. 23, 1944

INVENTOR.
Uno Lamm
BY
James Aiken
Attorney

Patented Aug. 16, 1949

2,479,242

UNITED STATES PATENT OFFICE 2,479,242

GRID CONTROL FOR STATIC CURRENT CONVERTERS

Uno Lamm, Ludvika, Sweden, assignor to Allmänna Svenska Elektriska Aktiebolaget, Vasterås, Sweden, a Swedish corporation Application December 23, 1944, Serial No. 569,514
In Sweden November 25, 1943

Section 1, Public Law 690, August 8, 1946
Patent expires November 25, 1963

12 Claims. (Cl. 315—252)

This application is directed to improved means for the commutation of rectifiers in plural or polyphase systems including those derived from a single phase source in full wave rectification circuits.

The commutation procedure in current rectifiers, inverters, or frequency changers may, as regards the obtainment of reliable operation, be divided into two principally different types. In one of these types, represented for instance by the spontaneous commutation of a rectifier or by the second stage of a forced commutation by means of a condenser, the voltage available for effecting the commutation rises during the whole procedure, which means that a complete commutation is always ensured. In the other type, presenting itself for instance in inverters, operating at a comparatively high ratio between direct current and alternating current voltage, or in the first stage of a forced commutation by means of a condenser, the voltage available for the commutation is lowered during at least the main portion of the commutation procedure, whence there is always a risk of the commutation being not completed until too late. The voltage available for effecting the commutation is for instance, at a commutation between two anodes having a common cathode, equal to the voltage between the two anodes. Generally it may, at least immediately before the beginning of the commutation, be regarded as equal to the voltage across the relieving valve path (the valve path to be ignited), since the voltage across the previously active valve path may be neglected. During the commutation procedure, the voltage is essentially consumed in the reactances of the commutation circuit.

The risk of non-completion of the commutation is particularly imminent at irregularities in the operation, for instance when the current is suddenly increased, whereby a higher commutation voltage is necessitated, or when the shape of the voltage curve is occasionally altered so as to reduce the commutation voltage. An incomplete commutation or one which is not terminated until too late is especially dangerous in inverters where the consequences thereof are practically equivalent to a short-circuit.

According to the present invention, the commutation is made independent of such incidents, which otherwise might prevent its termination in due time, by an arrangement, which provides that the control electrode potential, for example the grid potential of the relieving valve path, at the instant of initiating the commutation, is derived from a voltage in the main circuit determining the commutation in such manner as to follow the variations of the said voltage at the said instant. For instance, the voltage across the relieving valve path before the commutation may form a main component of the said voltage determining the commutation. In many cases, it may be advisable to make the grid potential depend also on the time derivative of the last-mentioned voltage, for instance either so that the derivative must be negative and the voltage at the same time inferior to a certain value for effecting the ignition, or so that the ignition depends on the ratio between the voltage and its time derivative, said ratio being, for a rectilinearly decreasing voltage, equal to the time available for the commutation and for deionisation and blocking of the relieved valve path.

An electrode control according to the present invention offers in many cases other advantages than to make the commutation independent of incidental variations of the voltage curve. This is especially the case in high tension current converters, where comparatively expensive transmission channels are generally required between the more or less automatic electrode control device for the normal operation, which usually operates substantially at earth potential, and the control electrodes proper with their nearest accessories. In deriving the control electrode potentials according to the present invention, the number of the said transmission channels can in most cases be considerably reduced, for instance to one single channel for transmitting an appropriate comparison quantity, by the adjustment of which all the operational regulation is effected, as is made clear by the following detailed description.

In the accompanying drawing,

Fig. 1 shows a voltage diagram of an inverter, while Figs. 2–6 diagrammatically show different forms of the present invention.

In Fig. 1, the curves I, II, III represent the voltages of for instance the anodes of three valve paths operating in three-phase, said voltages being measured with respect to a neutral point, if the cathodes are connected together, which is assumed in the following lines for the sake of simplicity. The heavy portions of the curves correspond to the time intervals in which the respective valve paths are operative and the cathode thus has practically the same potential as the respective anode. When the commutation for instance from the path I to the path II is to begin, the difference between their voltage curves thus also represents the voltage between anode and cathode in the path II which, for the reason that it takes over the current, is termed the "relieving" valve path, as distinguished from the path I which is termed the "relieved" one. As is well-known, the commutation must always be complete and the deionisation and blocking of the relieved path must have been effected before the curves intersect, therefore the commutation must be initiated by unblocking the relieving path a certain time before the point of intersection. It is also well-known, that a certain voltage difference, i. e. an initial voltage across the relieving valve path, is needed for the act of commutation, i. e. for overcoming the commutation reactances, and also that this voltage as well as the time of deionisation depend on the current, in view of which it may become necessary to make the instant of initiating the commutation depend on the current.

As already said, it has long been well-known to pay attention to all these facts, and this is also very simple as long as the voltage curves retain their regular shape shown in Fig. 1 and a fixed phase position. It may, however, often happen that the curve shape or the phase angle or both are incidentally altered in an unfavorable direction, so that, with a fixed instant of initiating the commutation or with one adjustable with the load, the commutation cannot be completed, either because the point of intersection is displaced backwards in time, or because the voltage is not sufficient to overcome the commutation reactances. For preventing this risk, the grid control is so arranged, that the instantaneous value of the grid potential of the relieving valve path is derived from a voltage in the main circuit determining the commutation.

Figure 2:
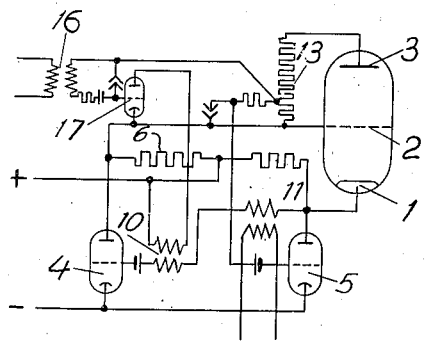

Fig. 2 shows a connection for this purpose which is particularly suitable for high-voltage current converters. The figure shows only one of the valve paths of the converter, having a cathode 1, a grid 2 and an anode 3, and the connection for grid control. The latter contains two auxiliary valves 4, 5 of electronic valve type, i. e. vacuum tubes, so arranged that only one can be conducting at a time, and which alternatively make the grid 2 positive (when the tube 5 is active) and negative (when the tube 4 is active). For blocking the tube 4 and thus making the grid 2 positive, a transformer 10 is employed, while impulses of the opposite character are transmitted by a transformer 11.

The impulses transmitted by the transformer 10 are, in this embodiment, produced by the following means. A high-ohmic resistance 13 is connected between the anode and grid of the main valve. A voltage is derived from a portion of this resistance adjacent to the grid and is impressed, in opposition to the voltage of transformer 16, on the grid of vacuum tube 17. The voltage of the transformer 16 may be derived from the main voltage over a phase shifting device in any manner well known in the prior art. This transformer voltage may have substantially the magnitude and phase represented by the dotted curve A in Figure 1. However, the scale of curve A is magnified vertically with respect to the scale of the main voltage curves by a factor substantially equalling the ratio of the whole resistance 13 to the portion thereof included in the control circuit. At the instant when the commutation is to begin, the voltage of the transformer obtains the same value as the voltage derived from the resistance 13, and the electronic tube 17 which is normally conducting becomes blocked, whereby an extinguishing impulse is impressed on tube 4 by means of the transformer 10. As previously stated, this means that the grid 2 of the main valve obtains a positive voltage and this valve is therefore ignited. The commutation therefore begins at the instant a, referring to Figure 1, which is defined by the condition that the voltage of the transformer 16 obtains the same value as the voltage derived from the resistance 13. The voltage on the grid of the vacuum tube 17 then passes over to a negative value whereby the tube 17 is blocked and thus interrupts the current through the primary winding of the transformer 10. Such an interruption will cause a steep voltage impulse in the secondary winding, as is well known, and this impulse acts on the grid of the tube to block it. The anode of the tube 4 is then made positive by its connection to the plus terminal of an anode potential source through the resistance 6, and so is also the grid 2 of the main valve which is directly connected to the anode of tube 4. The main valve is therefore ignited. The advantage of employing blocking impulses in the electronic tubes 17 and 4 for this purpose is that these tubes, on account of the unavoidable inductance in the circuits, react more rapidly for blocking impulses than for igniting impulses.

The reason for making the counter-voltage on the grid of the electronic tube 17 sine-shaped instead of constant is on one hand, that it should be possible, as an emergency step, to ignite the valve II (Fig. 1) at an earlier instant b, if the immediate preceding commutation has failed, in order to prevent a too heavy rush of current, and on the other hand, that an ignition at any other instant should be prevented. If the preceding commutation has failed, the valve II is at the instant b subjected to a voltage E, which represents the difference between the curves III and II. At the same instant, this voltage sinks below the value represented by the curve A. The valve II is then ignited at the proper instant to afford an ample time for commutation of the increased current and further, in a two-way connection, to complete this commutation before the commutation of the opposite valve path begins, for avoiding a simultaneous commutation of twice the current, and finally also for preventing the number of volt-seconds propelling this current from becoming excessive. Following the course of the voltage curves, it is found that a commutation is normally possible only at the instant a and in the event of a failure only at the instant b.

The derivation of the counter-voltage on the grid of the electronic tube 17 in the manner now described has, however, the inconvenience, that it may be necessary to take special steps for preventing, in the case of a deformation or sudden phase displacement of the curve of the main operation voltage, such disturbances from influencing also the curve A, whereby the grid control would not fulfil its essential purpose. In order to avoid this inconvenience, the sine-shaped voltage curve A may be replaced by a curve of such character as the dash and dotted curve B. This curve may, even if its superposed crests are derived from the main voltage, be made practically independent of any perturbations of this voltage. At the same time there is required, however, for the reason that the comparison voltage represented by the curve can never become negative, a completion of the condition for initiating the commutation, for instance that the time derivative of the voltage determining the commutation should be negative. A connection for this purpose is shown in Fig. 3, which only shows the means for obtaining the primary ignition impulse, while the rest of the grid control apparatus may be arranged according to Fig. 2 or in any other manner.

Figure 3:
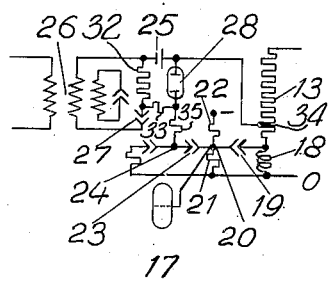
Figure 4:
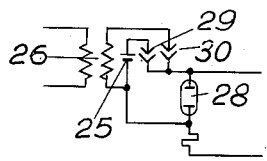

In Fig. 3, as well as in Fig. 2, the numeral 13 designates a high-ohmic resistance, which is supposed to be connected between the anode of the main vessel and a point with a potential near the cathode. At the cathode end of this resistance and in series therewith, there is in Fig. 3 a small inductance 18. The junction point between the resistance and the inductance is connected to a point 20 through a valve 19, the point 20 being, possibly through a voltage source, connected with a control grid, corresponding for instance to the grid of the electronic tube 17 in Fig. 2. The valve 19 admits a current only towards the point 20. This point is also, through a resistance 21, connected to the lower end of the inductance 18 (the end adjacent to the cathode), which is regarded as of zero potential, and through another resistance 22 with a point having negative potential. Through a valve 23, which admits a current only towards the point 20, said latter point is connected to a point 24 which forms the negative terminal of a voltage source giving the voltage curve B in Fig. 1. This voltage source consists of a direct current voltage source 25 in series with a secondary winding of a transformer 26 and a valve 27 admitting only one half wave of the alternating current, while the other half traverses another secondary winding with a valve acting in the opposite direction. In parallel to the sum of these two voltage sources, there is a voltage-dependent resistance for instance in the shape of a glow-discharge lamp 28, which cuts off any total voltage lying above a certain level so as to give a composite voltage curve of the type represented by the curve B of Fig. 1. The difference between the voltage derived from the resistance 13 and the aforesaid voltage according to the curve B presents itself in the point 24, which becomes negative when the commutation is to be initiated. For making the point 20 negative it is, however, also necessary that the top end of the inductance 18 becomes negative, which occurs as soon as the time derivative of the current in the resistance 13, thus the time derivative of the voltage across the said resistance, becomes negative. If those two conditions are fulfilled at a time, no current can traverse the valves 19, 23, and therefore the potential of the point 20 will be determined by its position between the zero point and the negative end of the resistance 22.

The transformer 26 with its two secondary circuits containing valves admitting the current in different directions gives in each of these circuits a current containing only the half-waves of either sign. In the circuit containing the valve 27 and the resistance 32, a voltage is created which contains only the half-waves of one sign, making the top of the resistance 32 positive with respect to the bottom. To this voltage, the constant one obtained from the source 25 is added, and this composite voltage is impressed on the circuit formed by the glow discharge lamp 28 and the resistance 33. The lamp has the characteristic property that any voltage above a certain limit impressed thereon strongly increases the current, and this strong current creates a voltage drop in the resistance 33 which practically acts as cutting off any voltage above a certain limit. The resultant voltage curve across the glow discharge lamp will therefore be composed of a constant basic voltage and trapezoidal half waves superimposed thereon, thus of the nature of the curve B in Figure 1.

As stated above, the ignition of the next valve, for instance that presenting the voltage curve II in Fig. 1, should take place when the voltage thereon, thus the voltage difference between curves II and I, falls below a certain value represented on a larger scale by the curve B, while at the same time the time derivative of the said voltage is negative. The first one of these conditions is fulfilled in the following manner: A small fraction of the voltage across the resistance 13, which is supposed to be connected substantially in the same manner as in Fig. 2 and thus represents practically the voltage across the main valve, is obtained between the point 34 and the bottom of the resistance. This fraction is small as compared with the total voltage across the resistance 13. Practically as long as the voltage between the point 34 and the lower end of the resistance 13—represented in Fig. 1 by the difference between the curves II and I on a scale equal to that of the curve B—is higher than that obtained from the lamp 28—represented by the curve B—a current will thus flow from the point 34 through the lamp 28, resistance 35, valve 23, resistance 21, zero conductor and reactor 18 back to resistance 13. This current makes the points 24 and 21 positive with respect to the zero conductor. As soon as the voltage between the point 34 and the lower end of the resistance 13 drops below that across the lamp 28, on the contrary, a current in the opposite direction is blocked by the valve 23, and unless a current flows through the valve 19, as hereinafter described, the point 20 becomes negative by its connection through the resistance 22 with a point having negative potential.

The possibility of a current flowing through the valve 19 is determined by the second condition to be fulfilled; namely, that the time derivative of the voltage across the resistance 13 is negative. As long as it is positive, the reactor 18 opposes the current flowing downwards through the resistance 13, and the potential on the upper end of the reactor is thus positive with respect to the lower or zero end. A current then flows through the valve 19, making the point 20 positive, irrespective of the conditions to the left of said point. As soon as the time derivative referred to becomes negative, the upper end of the reactor 18 also becomes negative and the valve 19 blocks the current. If both valves 19 and 23 block, the point 20 becomes definitely negative and impresses a negative potential on the grid of tube 17 which has the same function as the tube 17 in Figure 2 and thus starts the ignition of the main valve as soon as its grid becomes negative.

The direct current voltage source 25, which preferably may consist of a rectifier with a device for keeping the voltage constant and smoothening means, and the alternating current voltage source may preferably both be adjustable. For facilitating an adjustment from outside, especially in high voltage converters, in which it must be effected by means of high tension insulators or other comparatively complicated transmission means (channels), it may sometimes be preferred to employ a connection according to Fig. 4. This figure, which corresponds to the left hand part of Fig. 3, has in common with the latter the voltage-dependent resistance 28 for cutting off the wave crests of the voltage curve. The ends of this resistance are connected to two parallel voltage sources, one alternating current source 26 and one direct current source 25, each across a valve 30 and 29 respectively, said valves permitting at any instant only the higher voltage to act. A voltage curve of the same type as in Fig. 3 is thus obtained, but an adjustment of the direct current voltage only affects the lower value of the curve B, while the higher one is determined by the alternating current voltage only. The voltage-dependent resistance 28 may here be omitted if the primary voltage of the transformer 26 has a flattened curve shape.

Figure 5:
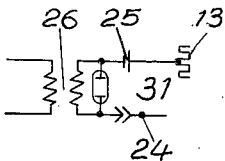

It may also be possible to add, according to Fig. 5, a flattened alternating current from a transformer 26, which may be corrected by means of a voltage-dependent resistance 31, simply to a direct current voltage from a source 25 and to impress the sum on the point 24 in Fig. 3.

It may be sufficient to employ a constant comparison voltage in normal operation and to raise this voltage only on the occasion of a commutation failure. Such a raising may be effected practically instantaneously by the aid of a valve or a voltage-dependent resistance influencing the comparison voltage, said valve or resistance being influenced by a consecutive phenomenon of the commutation failure, for instance an abnormal voltage or current. In two-way converters, the circumstance that opposite anodes carry current simultaneously may be employed for this purpose, as this is not normally the case. In this arrangement, no transmission from parts of considerably different potential is necessary.

Figure 6:
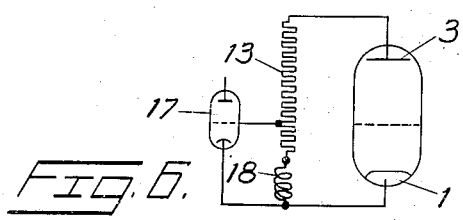

In some cases, it may be advisable to initiate the commutation at an instant when a certain proportion prevails between the voltage determining the commutation and its (negative) time derivative. When the form of the voltage curve does not too much differ from a straight line, the said proportion forms a measure of the time available for the commutation. A connection for this purpose is illustrated in Fig. 6 which shows a main valve, a resistance 13 connected in series with an inductance 18 between the anode 3 and cathode 1 of said valve, and an electronic tube 17, the cathode of which is connected to the cathode of the main valve, while its grid is connected to a point on the resistance 13. At the instant, when the voltage across the portion of the resistance lying between the tube grid and the reactance becomes equal to the voltage across the inductance, determined by the decrease of the current, the point connected to the grid of the tube 17 obtains zero potential, whereby the tube may be blocked. If it is desired to vary the proportion between the voltage and its time derivative at which this occurs, the bottom portion of the resistance 13 may be in the form of a voltage-dependent resistance which is varied by an impressed cross-voltage, either on a prismatic resistance bar or in a bridge connection between four resistances connected in tetragon.

If, in any of the connections according to Figs. 3-6, it is desired to employ the bottom portion of the resistance 13 for deriving an extinguishing impulse for the main valve, as has been indicated in Fig. 3, the inductance 18 may be placed above instead of below the said portion. The modifications of the connection involved hereby are obvious to anyone skilled in the art. Instead of reproducing the time derivative of the voltage by means of an inductance traversed by the current, the voltage itself may be impressed on a condenser in series with a resistance and the voltage derived from this resistance. The form shown using an inductance is, however, in most cases simpler.

The invention is of course applicable on any kind of grid control where the commutation can be initiated by a voltage passing through a certain value. The expression "grid control" then also includes the control, in most cases fully equivalent therewith, by means of rapidly acting ignition anodes (ignitors) determining the instant of igniting the valve path.

The control described which depends on the instantaneous values of the voltage determining the commutation and/or its time derivative may be combined in different manners with other control means, for instance the usual, generally time-dependent one. The control means which immediately influences the grids, which may receive impulses from different devices then automatically act in such manner that on each commutating occasion any impulse arriving after the starting of the commutation becomes inactive. For instance, in an inverter or frequency changer, the grid control of the normal operation may be effected in a manner known before, while the control according to the present invention is kept in reserve so as to enter into function if the normal control in some case might not be able to effect a commutation. In this case, the adjustable quantity, for instance a comparison voltage, which determines the instant of commutation, of course may pay respect to all factors influencing the duration of the commutation, in the first line of course to the current.

I claim as my invention:

1. In a polyphase current converter including at least one ignition-electrode-controlled rectifier path for each phase, a network having input terminals and output terminals, said input terminals being connected to a source of varying potential dependent on the instantaneous difference of the voltages in the relieved and the relieving rectifier paths and to a comparison voltage, said network including means to supply to its output terminals a potential proportional to the difference between such comparison voltage and such instantaneous difference, and said output terminals being connected in the ignition circuit of the relieving rectifier path, whereby the firing time of said relieving rectifier path is determined by the instantaneous variations of the voltage difference between relieving and relieved rectifier paths.

2. In a polyphase current rectification system comprising at least two electrode-controlled rectifier paths each having a cathode, a control electrode, and an anode, and arranged to conduct in sequential order, a network having input terminals connected in the anode-cathode path of the relieved rectifier path and to a comparison voltage, said network including means to supply to its output terminals a potential proportional to the difference between such comparison voltage and the instantaneous voltage of the relieved rectifier path, and having the output terminals connected in the control electrode circuit of the relieving rectifier path, whereby the control electrode potential of the relieving rectifier path is a function of the instantaneous variations of the anode-cathode potentials of the said relieved rectifier path.

3. In a polyphase current rectification system, a plurality of electrode-controlled rectifier paths, each having at least a cathode, a control electrode, and an anode; a network having input and output terminals said input terminals being connected to sources of a first potential and a second potential, said first potential being proportional to the difference, and said second potential being proportional to the time rate of change respectively of the instantaneous voltages applied to the relieving and relieved rectifier paths; said network including means to furnish to its output terminals a potential proportional to the algebraic sum of the first and second potentials said output terminals being connected in the control electrode circuit of the relieving rectifier path to render the same conducting at a predetermined algebraic sum of the said first and second potentials, whereby the control electrode potential of the said relieving rectifier path varies as the ratio between the main voltage difference between the relieving and relieved rectifier paths and the time derivative of said difference.

4. In a polyphase rectification system comprising at least a relieved and a relieving electrode-controlled rectifier path, each having at least a cathode, anode and control electrode, a network including a resistance having a voltage-dependent portion connected between an anode and cathode with the voltage-dependent portion proximate the cathode and time rate of change control voltage means responsive to the time rate of change respectively of the instantaneous voltages applied to the relieving and relieved rectifier paths for varying said voltage-dependent resistance portion, said network having output connections applied to said control electrode, whereby the control electrode potential of the said relieving rectifier path varies as the ratio between the main voltage difference between the relieving and relieved rectifier paths and the time derivative of said difference.

5. In a polyphase current rectification system including electrode-controlled rectifiers each having at least a cathode, control electrode, and anode, and arranged to conduct in sequence whereby at intervals one of said rectifiers is being relieved of the load and one of said rectifiers is assuming said load, a network having input terminals connected to a resistance responsive to the voltage difference between the relieving and relieved rectifier paths, having other input terminals connected to means for supplying a constant potential and still other input terminals connected to the ends of a reactor supplied by a current proportional to the aforesaid voltage difference, said network having output terminals connected to a valve determining the firing control electrode potential, said network being adapted to supply a potential to the output terminals when the magnitude of voltage difference between the relieving and relieved rectifier paths passes through a selected value, and the potential across said reactance is that corresponding to a decreasing current.

6. In a polyphase electrical system, a polyphase source of potentials, and a plurality of electrode-controlled rectifier paths, said system having at least one rectifier in each phase, means for controlling the ignition point of said rectifiers whereby they conduct in sequence and whereby at a particular instant one rectifier is relieving a relieved rectifier of its load, a network having input terminals connected to a source of a first potential which is a portion of the potential between the relieving and relieved rectifier paths, and in opposition thereto to a source of a second potential which is of a comparison voltage, and having means to supply to its output terminals a potential proportional to the difference between said first and second potentials said network having output terminals applied to the control electrode of said relieving rectifier path whereby said relieving rectifier path becomes conductive at a preselected potential difference between said first and said second opposed potentials.

7. In a polyphase current rectification system wherein a plurality of electrode-controlled rectifier paths are arranged to conduct in sequence and at a particular instant of commutation one rectifier path may be termed the relieved rectifier path and a second rectifier path next in sequential order may be termed the relieving rectifier path; a network having applied thereto in opposition a portion of the voltage difference between the relieving and relieved rectifier paths, and a voltage similar in frequency and wave shape to one of the polyphase voltages, and having means to supply to its output terminals a voltage proportional to the voltage difference between said opposed voltages, the output terminals of said network being connected to the control electrode of said relieving rectifier path whereby said relieving rectifier path is rendered conducting at a predetermined voltage difference between the said opposed voltages.

8. In a polyphase grid-controlled rectification system including at least a relieving electrode-controlled rectifier path and a relieved electrode grid-controlled rectifier path; a network having a first and a second input, and a source of alternating voltage derived from one phase of said polyphase system connected to said first input and a second source of voltage having a value proportional to the voltage difference between the relieving and relieved rectifier paths connected to the second input and having means to supply to its output a voltage which is a function of the voltages applied to said first and second inputs; the output of said network being connected in the control electrode circuit of said relieving tube; whereby the igniting voltage applied to said control electrode is a function of the voltages applied to said first and said second inputs.

9. In a polyphase static current converter including at least a first and a second electrode-controlled rectifier path arranged to conduct in sequence whereby at any instant of commutation there is a relieving rectifier path and a relieved rectifier path; a network connected to a source of constant voltage and to a source of periodical voltage in addition thereto, and in opposition to the sum thereof to a source of voltage proportional to the voltage difference between the relieving and relieved rectifier paths and having means to supply to its output a voltage which is proportional to the algebraic sum of the voltages impressed on the network, the output of said network being connected in the controlled-electrode circuit of the relieving rectifier path whereby the same will conduct when the algebraic sum of the voltages impressed on said network is equal to the igniting electrode potential of the tube.

10. In a polyphase static current converter having a plurality of electrode-controlled rectifier paths and at a particular instant a relieving rectifier path and a relieved rectifier path; a first and second network; said first network containing therein a source of constant voltage and being connected to a source of alternating voltage derived from one phase of said polyphase system, and being arranged to add the two voltages together whereby the output of said network contains the sum of said voltages; said second network being connected to a source of voltage proportional to the voltage difference between the relieving and relieved rectifier paths and the output voltage of said first network and being arranged to supply to its output a voltage which is a function of the instantaneous magnitudes of the voltages applied to said networks; the output of the said second network being connected in the control electrode circuit of the relieving rectifier path.

11. In a polyphase static current converter having at least one electrode-controlled gaseous or vapor rectifier path for each phase whereby at any instant of commutation there is a relieving rectifier path and a relieved rectifier path; a resistance having a tap thereon and connected in series with an inductance connected in an anode-cathode path of the relieving rectifier path, means for comparing the voltage derived from said resistance tap and the time rate of change voltage derived from the junction of said resistance and the end of the inductance and means for applying the resulting voltage to the control electrode of the relieving rectifier path.

12. In a polyphase static current converter having at least one electrode-controlled gaseous or vapor rectifier path in each phase and having at an instant of commutation a relieving rectifier path and a relieved rectifier path; an electrode-control voltage deriving network connected to a first source of potential proportional to the voltage difference between said relieving and said relieved rectifier paths, means for impressing thereon a second potential which is the time derivative of said voltage difference and having an output terminal connected to said network through two paths, a rectifier in each path having impressed thereon said first and second potentials respectively and being so polarized that a positive electrode-control potential at the output terminal is determined by the simultaneous fulfilling of one potential condition for each path.

UNO LAMM.

REFERENCES CITED

The following references are of record in the file of this patent:

UNITED STATES PATENTS

| Number | Name | Date |
|---|---|---|
| 2,119,865 | Lamm | June 7, 1938 |